United States Patent [19]

Mack

[11] 4,311,571

[45] * Jan. 19, 1982

[54] RAPID PHASE TRANSFORMATION FOR POLY(BUTENE-1)

[75] Inventor: Mark P. Mack, Ponca City, Okla.

[73] Assignee: Conoco Inc., Ponca City, Okla.

[*] Notice: The portion of the term of this patent subsequent to Feb. 5, 1997, has been disclaimed.

[21] Appl. No.: 195,822

[22] Filed: Oct. 10, 1980

[51] Int. Cl.$^3$ .......................... C08F 6/00; C08F 8/00
[52] U.S. Cl. ........................ 204/158 S; 204/159.14; 525/191; 525/240; 528/491; 528/498
[58] Field of Search ............... 528/491, 498; 525/240, 525/191; 204/157.1 S, 158 S, 159.2, 159.14

[56] References Cited

U.S. PATENT DOCUMENTS

| | | | |
|---|---|---|---|
| 2,870,113 | 1/1959 | Jones | 528/491 X |
| 3,074,921 | 1/1963 | Carter | 528/491 X |
| 3,247,157 | 4/1966 | Reed, Jr. | 528/491 X |
| 4,038,477 | 7/1977 | Inoue | 528/487 |
| 4,187,158 | 2/1980 | Mack | 528/498 X |
| 4,219,639 | 8/1980 | Mack et al. | 528/494 |

FOREIGN PATENT DOCUMENTS 852929  11/1960  United Kingdom ............... 528/491

*Primary Examiner*—C. A. Henderson
*Attorney, Agent, or Firm*—Cortlan R. Schupbach, Jr.

[57] ABSTRACT

Poly(butene-1) in type II form can be accelerated to its stable type I form by applying a volatile solvent such as an olefinic hydrocarbon and allowing the solvent to evaporate. The phase transformation can be accelerated by additional treatment with heat below the melt temperature of about 90° C. and/or ultrasonic sound.

7 Claims, No Drawings

RAPID PHASE TRANSFORMATION FOR POLY(BUTENE-1)

This invention relates to a method for accelerating the phase transformation of poly(butene-1) from type II to type I form. More particularly, this invention relates to a method for accelerating the phase change of poly(butene-1) or PB by application of volatile solvents followed by evaporation of said solvents.

It has long been known that crystalline alpha-olefins exhibit polymorphism (alternately called phases, types or forms). In particular, isotactic PB exists in at least 4 distinct crystalline forms. This polymorphic behavior of PB was first reported by Natta and coworkers in *Nuovo Cimento*, 15, special number 1,52 (1960). The X-ray and density properties of the polymorphs were further studied by Zanetti et al, and reported in *Chim. e Ind.*, 43, 735 (1961).

Cooling a fresh melt of PB results in the formation of unstable tetragonal crystallites referred to by the previous workers as type II PB. These crystals gradually transform upon standing at room temperature to the stable hexagonal polymorph, type I PB. Complete type II to type I transformation may take from about a day to more than a week depending upon such variables as molecular weight, copolymerization, pressure, temperature and the presence of impurities. Descriptions of such transformations can be found in *Polymer Letters, Journal of Polymer Science*, Volume 2, pages 519–521 (1964). This article describes the various phase transformations of PB through various processing conditions including the hexagonal stable type I, the tetragonal unstable type II and the orthorhombic stable type III. Further discussions can be found in the *Journal of Polymer Science*, part A, Volume 3, pages 3803–3813 (1965), I. D. Rubin; and *Journal of Polymer Science, Polymer Letters*, Volume 5, pages 839–841 (1967), R. J. Schaffhauser. These references are representative of the art in the area which teaches the effects of the phase transformations.

Concisely, the unstable type II form of PB is colorless, transparent, soft, and easily deformed. In contrast, the stable type I polymorph is colorless, translucent, rigid, and not prone to physical deformation. In commercial applications melts of PB which are formed into desired shapes are of the type II form (easily deformable) and upon transition to a type I form often undergo undesirable shape changes. Therefore a process which accelerates this type II to type I transformation has a definite practical purpose.

The prior art has long sought a method to accelerate or to eliminate the phase transformation common to PB. Many authors have proposed methods for accelerating such transformation. Chief among these methods is mechanical stress, such as by working the polymer. This method, however, is clearly not useful where the polymer is placed into the desired finished form in a melt state since mechanical working would deform the desired shape. Other authors have proposed using seeding or nucleation to produce the crystal-crystal transition in poly(butene-1) such as described by Boor et al in the *Journal of Polymer Science*, Volume 62 (174), S70–S73 (1962). Mechanical stress is described in the *Journal of Polymer Science*, part B, 1(11) 587–91 (1963). As is apparent, none of these methods are suitable for commercial use. This is especially true with the nucleation techniques which are described in U.S. Pat. No. 3,499,884, Japan Kokai No. 7,482,788 and U.S. Pat. No. 3,558,551, all of which utilize impurities such as transition metals and polypropylene to accelerate the phase change. However, even with these methods, transition is slower than desired and often takes long periods of time.

It would therefore be desirable to provide a simple, efficient, and easily carried out process to accelerate the phase transformation between type II PB and type I PB.

It is an object of the instant invention to accelerate the phase transformation of PB from type II to type I. Other objects will become apparent to those skilled in this art as the description proceeds.

It has been discovered according to the instant invention that the phase transformation of crystalline PB from an unstable type II structure to a more stable type I crystal structure can be carried out in a convenient and economic fashion by treating type II PB with a volatile solvent, evaporating the solvent to produce some immediate transition to type I PB, followed by a rapid transition of the remainder of the article. The secondary transition after solvent evaporation can be accelerated by ultrasonic treatment and/or heat treatments below the PB melt temperature of about 90° C.

The method of the instant invention is suitable for PB whether treated alone or in the presence of comonomers such as ethylene, propylene, isobutylene and other olefins, or merely blends of PB and other polymers such as polypropylene, and polyethylene in admixture with PB. The instant invention is useful for converting PB from type II to type I in any proportion, whether copolymers or blends of polymers or homogeneous PB. However, it is apparent that the instant invention is more useful when PB is predominant, i.e., above 50 percent in the copolymer or blend.

The solvents useful in the practice of the instant invention are those which produce the desired phase change. These solvents are normally volatile materials which evaporate rapidly from the surface of the polybutene, thereby causing the phase change. U.S. Pat. No. 4,187,158 describes contacting type II PB with volatile solvents. This patent is incorporated in its entirety into the present specification by reference. Representative examples of such solvents are alkane isomers, cycloalkane isomers and ethers.

It has now been discovered that alkyl halides and olefinic hydrocarbons including alkenes, (both linear and branched) and dienes likewise accelerate this phase change. Type II poly(butene-1) is simply contacted with the solvent and the solvent is allowed to evaporate. Representative but non-exhaustive examples of olefinic hydrocarbons include
ethylene
propylene
1-butene
2-butene
isobutylene
butadiene
1-pentene
2-pentene
isoprene
1-hexene
2-hexene
3-hexene
1-heptene
2-heptene
3-heptene
3-methyl-1-butene 2-methyl-2-butene
2,3-dimethyl-2-butene Representative but non-exhaustive examples of alkyl halides are methyl chloride
methyl bromide
methyl iodide
ethyl chloride
ethyl bromide
ethyl iodide
n-propyl chloride
n-propyl bromide
n-butyl-chloride
isopropyl chloride
isopropyl bromide
isopropyl iodide
isobutyl chloride
isobutyl bromide
sec-butyl chloride
sec-butyl bromide
tert-butyl chloride
tert-butyl bromide
vinyl chloride
vinyl bromide
vinyl iodide
allyl chloride
allyl bromide
crotyl chloride (1-chloro-2-butene)
3-chloro-1-butene
dichloromethane Articles comprised of type II PB-1 are simply contacted with the volatile solvent, and the solvent is allowed to evaporate.

Once the solvent has evaporated, examination of the article treated will reveal that an immediate transformation from type II to type I PB has occurred in the area contacted by the solvents. The interior of the article will be predominantly type II PB. However, the type II PB remaining is rapidly accelerated in the phase transformation to type I PB by the simple presence of the type I PB at the surface of the article. The phase transformation type II to type I of the PB in such treated articles, as rapid as it is as compared to the prior art methods, can yet be further accelerated by treatment with ultrasonic waves, or heating the article to temperatures below the melting point of the PB (about 90° C.).

In all examples shown below crystalline isotactic samples of PB were used. The unstable crystallites of type II PB were prepared by melting stable samples of polymer at 140° to 160° C. and cooling the samples immediately to room temperature. The existence of the type II polymorph was confirmed using infra-red (IR) and X-ray diffraction spectroscopy. The polymorphs of type I, II, and III PB exhibit unique infra-red spectra as demonstrated by Clampitt et al in the *Journal of Polymer Science*, C6, 43–51 (1964). These characteristic spectra were used to confirm the existence of the various polymorphs for film samples of polymer.

The invention is more concretely described with reference to the examples below wherein all parts and percentages are by weight unless otherwise specified. The examples are provided to illustrate the instant invention and not to limit it.

In all examples, crystalline isotactic samples of poly(butene-1) were used. The polymer was obtained from the Shell Chemical Company. The unstable crystallites of type II polymer were prepared by melting the poly(butene-1) at between 140° and 160° C. to form a thin film of polymer. The melt was immediately cooled to room temperature. The existence of the type II polymorph was confirmed by infra-red spectroscopy (IR). The polymorphs of polybutene type I, II, and III exhibit unique infra-red spectra as described on page 49 of "Poly(1-Butene)—Its Preparation and Properties," I. D. Rubin, Polymer Monographs, Volume 1, Science Publishers, Inc., New York, 1968.

The bands of 900 $cm^{-1}$ and 925 $cm^{-1}$ were used to identify the polymorphs. The type II polymorph has a strong band at 900 $cm^{-1}$ while the type I has a strong band of 925 $cm^{-1}$. The transformation was followed by the diminishing intensity of the 900 $cm^{-1}$ band (type II) and the intensification of the 925 $cm^{-1}$ band (type I). The half life of the transformation was estimated by comparing the relative intensities of the 900 and 925 $cm^{-1}$ bands. The half life for the type II to type I transformation of an untreated sample under these conditions was 21.6 hours.

EXAMPLE 1

A film of poly(butene-1) was prepared by melting crystals of the homopolymer at 150° C. The melt was cooled immediately to room temperature. The film was analyzed in IR confirming the existence of the type II polymorph by a strong band at 900 $cm^{-1}$.

The film was dipped into a beaker containing 1-hexene, withdrawn and 1-hexene was allowed to evaporate within 10 to 15 seconds. The sample was then scanned in the IR showing the existence of the type I polymorph at 925 $cm^{-1}$. The sample was scanned 17 minutes later. The type I polymorph almost equaled the type II polymorph in intensity. After a further 12 minutes, the intensity of the type I band equaled the intensity of the type II band. The half-life of the transformation was 29 minutes based on IR analysis while the control sample took 21.6 hours.

EXAMPLE 2

A film of poly(butene-1) was prepared by melting crystals of the homopolymer at a temperature of 150° to 160° C. The melt was cooled immediately at room temperature and the resulting film was analyzed in the IR showing the existence of the type II polymorph via a strong band at 900 $cm^{-1}$.

The film was dipped into a beaker containing trichlorotrifluoroethane (DuPont's Freon® TF Fluorocarbon), withdrawn after 2 seconds and the solvent was allowed to evaporate from the surface of the polymer. The sample was then scanned in the IR. A strong band remained at 900 $cm^{-1}$ showing type II polymorph but a shoulder of the type I polymorph was present. The band grew more intense. After 3.2 hours the type I band was easily discernable. After 4.25 hours band I at 925 $cm^{-1}$ almost equaled intensity in band II at 900 $cm^{-1}$. The acceleration effect was therefore present but not significant as compared to olefin solvents.

EXAMPLE 3

A film of poly(butene-1) was prepared by melting crystals of the homopolymer at 150° to 160° C. The presence of the type II polymorph was confirmed as previously described.

The film was dipped into a beaker containing methyl ethyl ketone (MEK) for 2 seconds and withdrawn. The solvent was allowed to evaporate from the surface of the polymer. The sample was then scanned in the IR but a change in its spectrum was not apparent.

EXAMPLE 4

A film of poly(butene-1) was prepared as previously described.

The film was dipped into a beaker containing 2-bromopropane for 2 seconds and withdrawn. The solvent was allowed to evaporate from the surface of the film. The sample was scanned in the IR showing a complex pattern. Three bands were present: One at 925 cm$^{-1}$ (type I), the most intense at 900 cm$^1$ (type II), and a third band at about 885 cm$^{-1}$ (unknown). After 1 and ½ hours the band at 925 cm$^{-1}$ was almost equal in intensity to the 900 cm$^{-1}$ band. However, the unknown band at 885 cm$^{-1}$ remained.

Thus it is apparent that the instant invention has provided a surprisingly simple, inexpensive and effective method for accelerating the phase transformation from the unstable type II to the stable type I polymorph of PB. The method is simple, effective, and can be accelerated by further treatment with heat or ultrasonic sound.

While certain embodiments and details have been shown for the purpose of illustrating this invention, it will be apparent to those skilled in this art that various changes and modifications may be made herein without departing from the spirit or the scope of the invention.

I claim:

1. A method for accelerating poly(butene-1) phase transformation from unstable tetragonal crystallites to stable hexagonal polymorph, the method comprising applying a material selected from the group consisting of olefinic hydrocarbons and alkyl halides to poly(butene-1) in type II (tetragonal) form, evaporating said material to cause an immediate phase change to type I (hexagonal) form in the area contacted, thereby accelerating phase transformation to a stable poly(butene-1) type I (hexagonal) form through the polybutene.

2. A method as described in claim 1 wherein the olefinic hydrocarbon is selected from the group consisting of
   ethylene
   propylene
   1-butene
   2-butene
   isobutylene
   butadiene
   1-pentene
   2-pentene
   isoprene
   1-hexene
   2-hexene
   3-hexene
   1-heptene
   2-heptene
   3-heptene
   3-methyl-1-butene
   2-methyl-2-butene
   2,3-dimethyl-2-butene 3. A method as described in claim 2 wherein the alkyl halide is selected from the group consisting of
   methyl chloride
   methyl bromide
   methyl iodide
   ethyl chloride
   ethyl bromide
   ethyl iodide
   n-propyl chloride
   n-propyl bromide
   n-butyl chloride
   isopropyl chloride
   isopropyl bromide
   isopropyl iodide
   isobutyl chloride
   isobutyl bromide
   sec-butyl chloride
   sec-butyl bromide
   tert-butyl chloride
   tert-butyl bromide
   vinyl chloride
   vinyl bromide
   vinyl iodide
   allyl chloride
   allyl bromide
   crotyl chloride (1-chloro-2-butene)
   3-chloro-1-butene
   dichloromethane 4. A method as described in claim 3 wherein phase transformation is further accelerated with ultrasonic sound waves.

5. A method as described in claim 4 wherein phase transformation is further accelerated with the application of heat below 90° C.

6. A method as described in claim 5 wherein an alkene is applied to copolymers of butene and isobutylene, copolymers of butene and propylene, copolymers of butene and ethylene, blends of polybutene with polyisobutylene, blends of polybutylene with polypropylene, and blends of polybutylene with polyethylene.

7. A method as described in claim 1 wherein the polybutene in tetragonal form is obtained from a melt of polybutene.

* * * * *